March 17, 1953     J. M. MICHAELSON     2,631,422

POWER SICKLE MOWER

Filed May 2, 1949     5 Sheets-Sheet 1

INVENTOR.
Joseph M. Michaelson
BY Harry D. Kiegor
Attorney

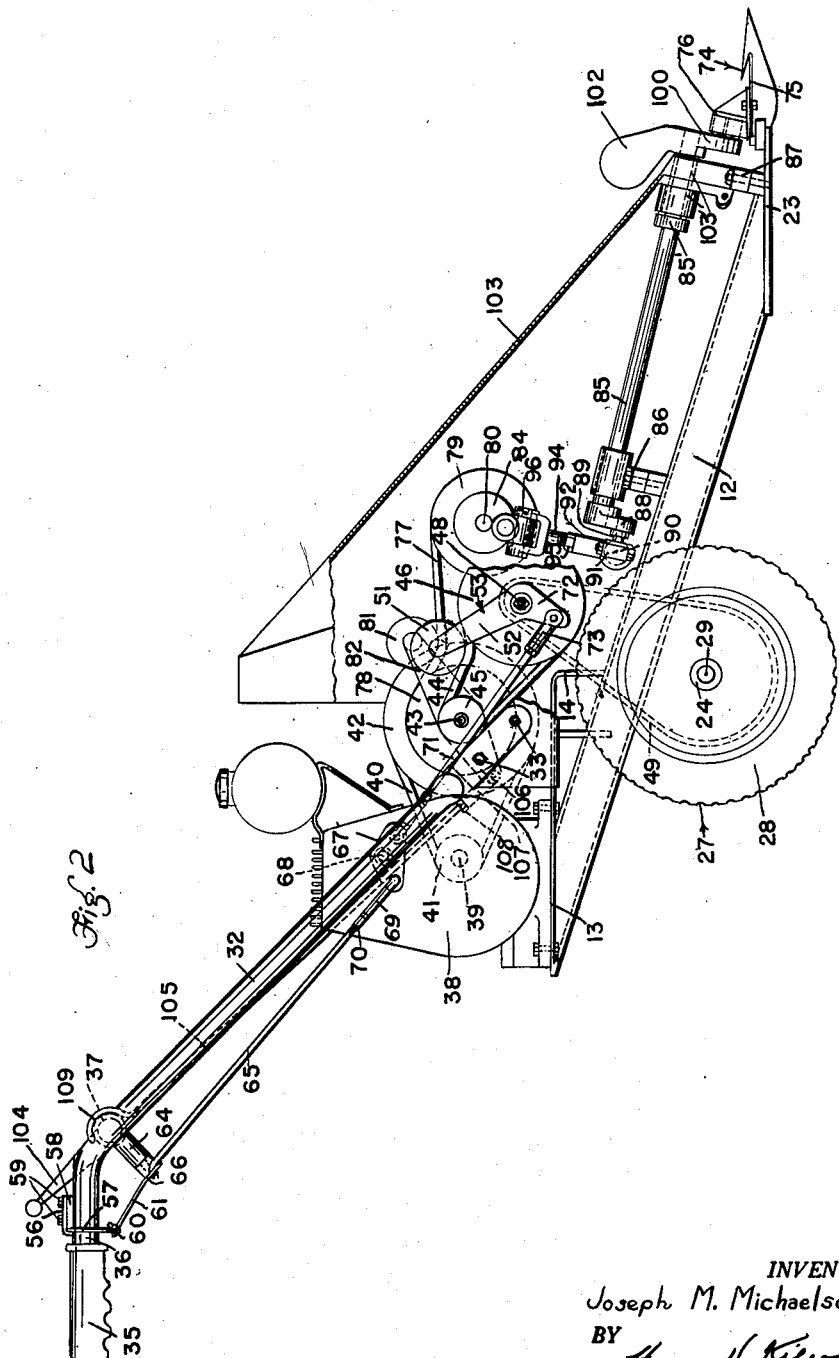

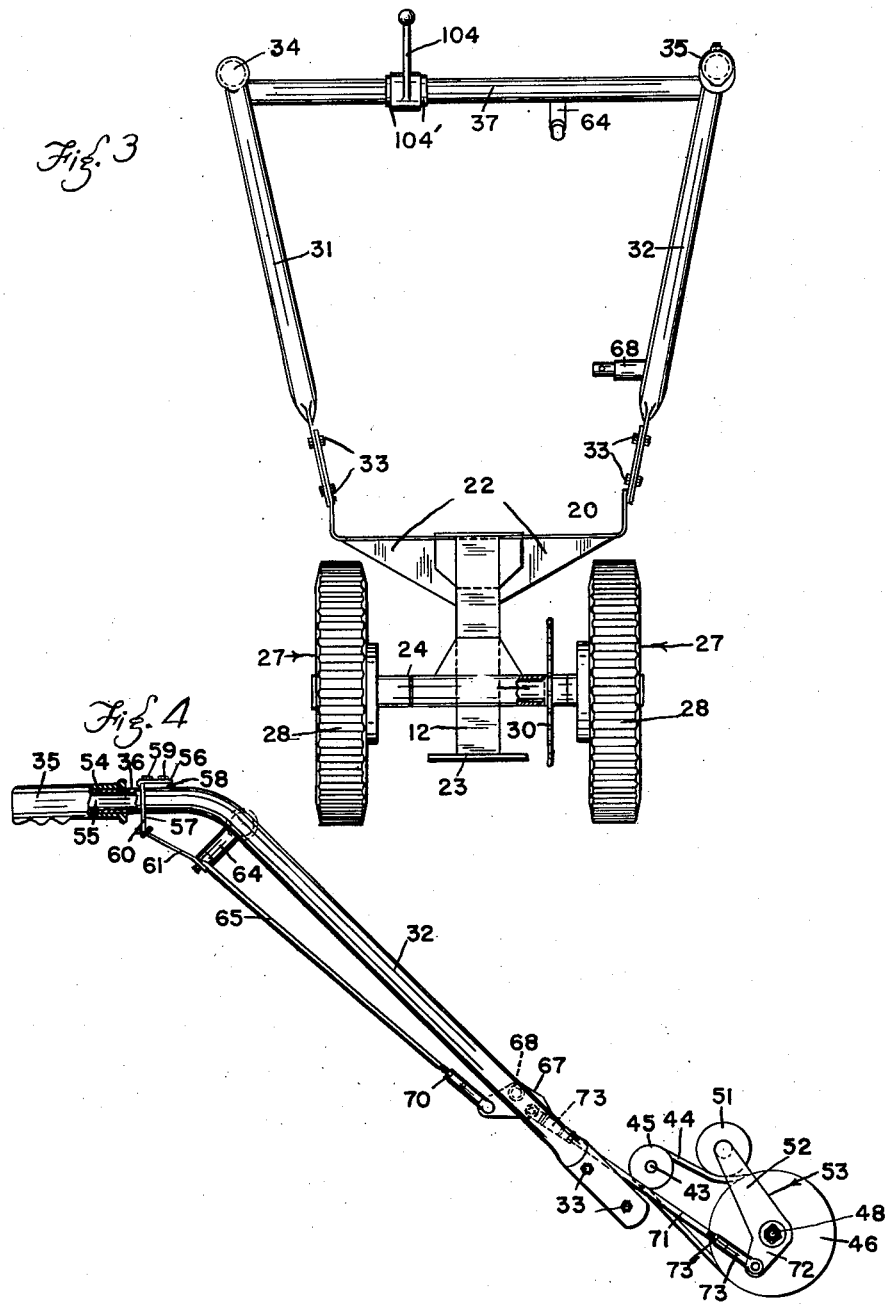

March 17, 1953　　　J. M. MICHAELSON　　　2,631,422
POWER SICKLE MOWER
Filed May 2, 1949　　　　　　　　　　　　　　　5 Sheets-Sheet 4
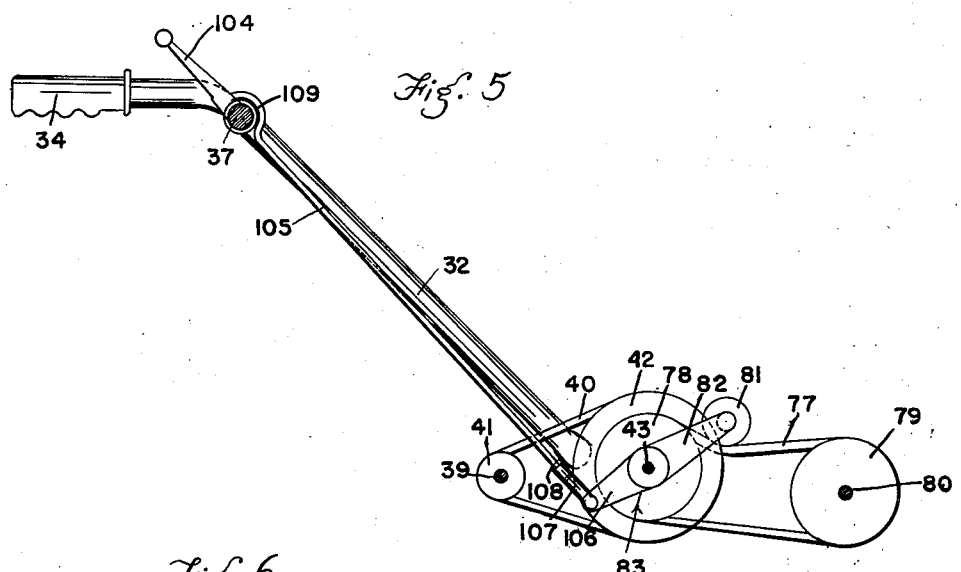
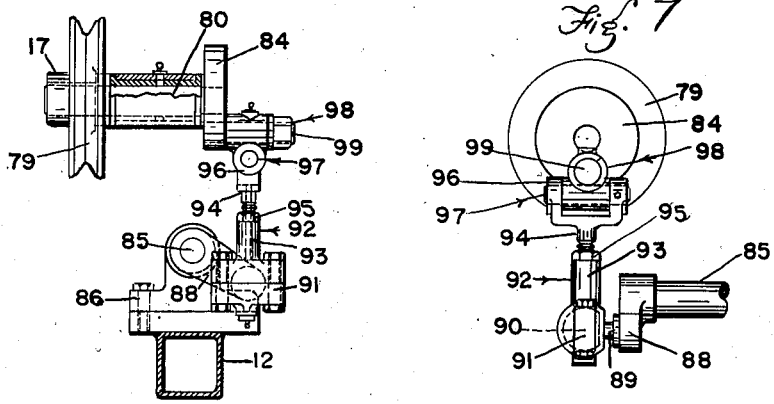
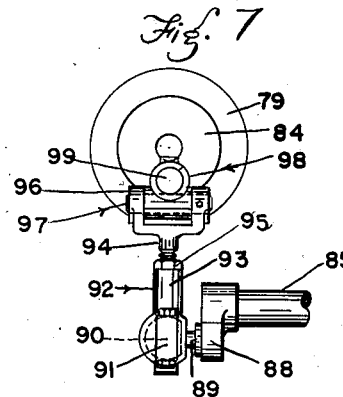
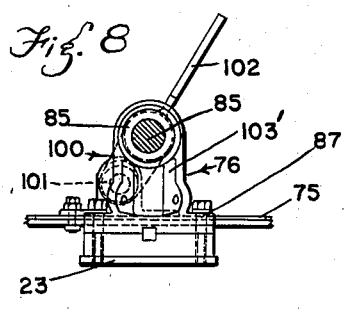
INVENTOR.
Joseph M. Michaelson
BY Harry W. Kilgore
Attorney March 17, 1953 J. M. MICHAELSON 2,631,422
POWER SICKLE MOWER Filed May 2, 1949 5 Sheets-Sheet 5

INVENTOR.
Joseph M. Michaelson
BY Harry N. Kilgore
Attorney

Patented Mar. 17, 1953

2,631,422

UNITED STATES PATENT OFFICE 2,631,422

POWER SICKLE MOWER

Joseph M. Michaelson, Minneapolis, Minn.

Application May 2, 1949, Serial No. 90,959

2 Claims. (Cl. 56—26.5)

My present invention relates to improvements in power mowing machines and, more particularly, to a mowing machine of the tractor type employing a reciprocating sickle.

An object of this invention is to provide a rocker shaft drive for the sickle.

Another object of this invention is to provide a counterweight on the rocker shaft that exactly balances the sickle, thereby eliminating vibration and also performing another important function in that it acts as a divider to throw grass as it is cut, to either side to prevent bunching thereof on the nose of the hood.

A further object of this invention is to provide a novel clutch and release in the driving connections for the sickle bar that permits idling of the engine, without operating the sickle bar, and also permits travel of the mower, without operating the sickle bar, and undue wear thereon.

To the above end, generally stated, the invention consists of the novel devices and combination of devices hereinafter described and defined in the claims.

In the accompanying drawings, which illustrate the invention, like characters indicate like parts throughout the several views.

Referring to the drawings:

Fig. 2 is a right side elevational view of the same;

Fig. 3 is a rear elevational view of the mowing machine with some parts removed;

Fig. 4 is an elevational view of the right handle bar removed from the mower and the traction clutch and grip-operated connections therefor;

Fig. 5 is an elevational view of the left-hand handle bar, sickle bar clutch and operating connections therefor, the tie rods for the handle bars being shown in section;

Fig. 6 is an enlarged detail view principally in rear elevation with some parts sectioned on the line 6—6 of Fig. 1;

Fig. 7 is a side elevational view of the parts shown in Fig. 6;

Fig. 8 is an enlarged detail view partly in rear elevation and partly in section taken on the line 8—8 of Fig. 1;

Figure 1:
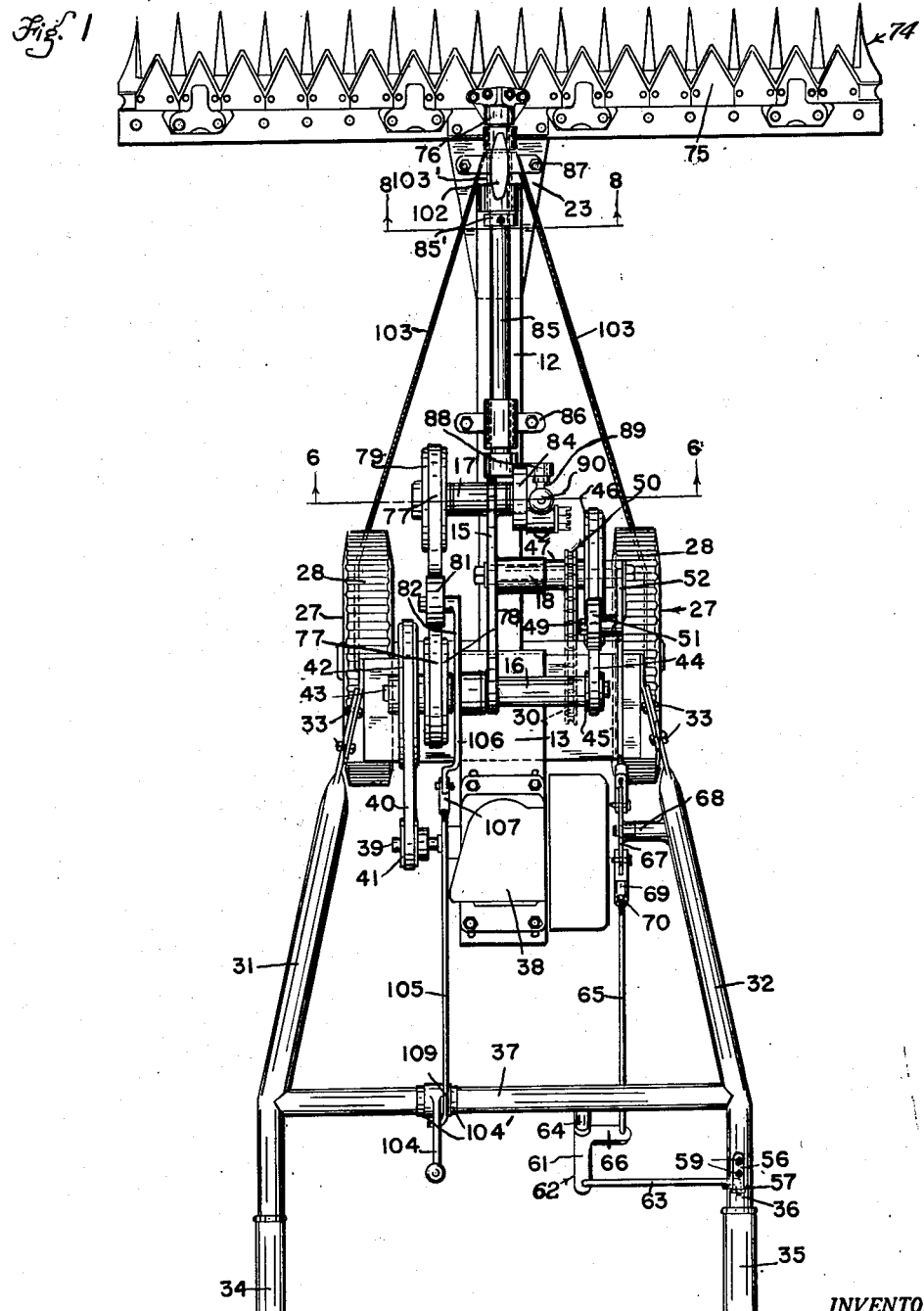
Fig. 1 is a plan view of the improved mowing machine.
Figure 9:
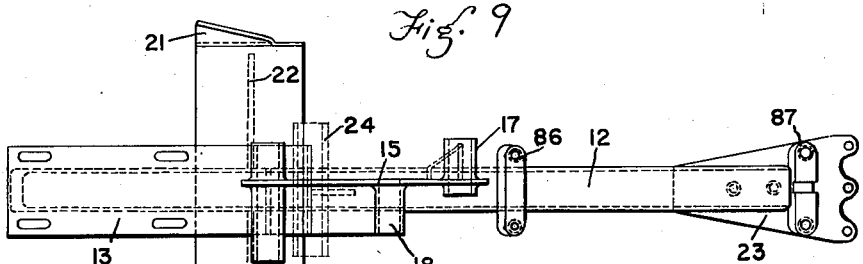
Fig. 9 is a plan view of the mower frame.
Figure 10:
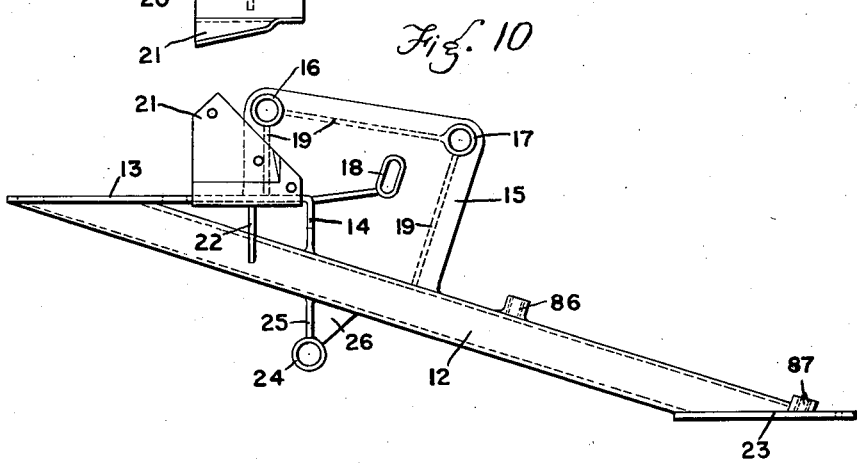
Fig. 10 is a right side elevational view of the same.
Figure 11:
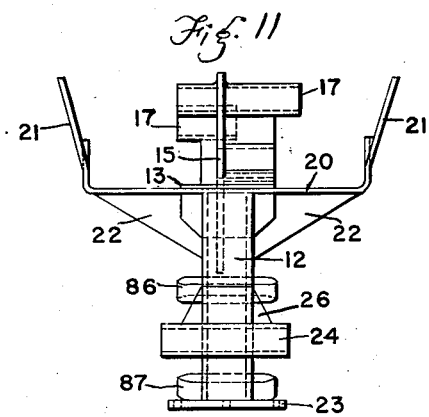
Fig. 11 is a rear elevational view of the mower frame.

The main frame 12 of the mower is in the form of a tube that is square in cross-section. This frame 12 is forwardly and downwardly inclined and the ends of said frame are in beveled parallel relation in horizontal planes. A motor bed 13, in the form of the flat plate, rests on the rear or upper end of the frame and is rigidly secured thereto. This motor bed 13 extends forwardly of the upper end of the frame 12 and its front end portion is turned downwardly to afford a support 14 rigidly secured to said frame. A thin upright plate 15 is rigidly secured to the forward end portion of the motor bed 13 and the frame 12 at the transverse center thereof.

A sleeve bearing 16 extends transversely through the plate 15 at the rear upper corner portion and a sleeve bearing 17 extends transversely through the plate 15 at the upper front corner portion thereof. On the plate 15, at its central portion, is an elongated bearing sleeve 18 that is upwardly and forwardly inclined. Reinforcing webs 19 rigidly connect the bearings 16, 17 and 18 to the plate 15. A flat plate 20 extends transversely under the motor bed 13 forwardly of the upper end of the frame 12 and is rigidly secured thereto. This plate 20 extends materially outwardly of the frame 12 and the end portions thereof are upwardly and outwardly inclined to afford handle-bar-attaching members 21. Reinforcing webs 22 rigidly connect the plate 20 the frame 12 and also afford a support for the motor bed 13. A plate 23 for attaching the cutting mechanism to the frame 12 extends under and forwardly of the front or lower end of said frame and is rigidly secured thereto. A tubular bearing 24 extends transversely under the frame 12 and is rigidly secured thereto by an upright plate 25 and a reinforcing web 26. The bearing 24 is directly below the motor bed support 14.

The frame 12 is supported on a pair of ground wheels 27 equipped with pneumatic tires 28. These wheels 27 are mounted on an axle 29 journaled in the bearing 24, with the customary ratchet drive but for the purpose of this case, it will not be necessary to show the same. A large sprocket wheel 30 is secured to the axle 29 for rotation therewith. A pair of handle bars 31 and 32 are secured to the members 21 of the plate 20 by nut-equipped bolts 33. These handle bars 31—32 are upwardly and rearwardly inclined and in diverging relation, and their end portions are turned into horizontal positions and equipped with hand grips 34 and 35, respectively, the latter being mounted to turn about a horizontal axis as shown at 36. The handle bars 31 and 32 are rigidly connected at their upper end portions by a crosstie bar 37.

An internal combustion engine, indicated as an entirety by the numeral 38, with the exception of its crank shaft 39, is mounted on the bed 13. The axle 29 is driven from the engine 38 by the following connections, to wit: a V belt 40 runs over a small V pulley 41 on the engine crank shaft 39 and a large V pulley 42 on a countershaft 43 journaled in the bearing 16. A V belt 44 runs over a small V pulley 45, on the opposite end of the countershaft 43 from the pulley 42, and a large pulley 46. This pulley 46 has a long hub 47 journaled on a shaft 48 in the form of a large nut-equipped bolt mounted in the bearing 18. The belt 44 has sufficient slack to slip on the pulley 46 so that the same remains idle. The axle 29 is driven from the pulley 46 by a sprocket chain 49 that runs over a small sprocket wheel 50 on the hub 47 of the pulley 46 and a large sprocket wheel 30 on the axle 29.

A roll 51 is provided for tightening the belt 44 to drive the pulley 46 by contacting and depressing the upper run of said belt. The roll 51 is journaled on the long arm 52 of a bell crank 53 pivoted on the outer end portion of the shaft 48.

The following connections are provided for operating the bell crank 53 by means of the control grip 35, to wit: the grip 35 is formed on a sleeve 54 turnably mounted on a tubular stud 55, which forms the outer end portion of the handle bar 32. The sleeve 54 and hence the grip 35 is held against axial movement on the stud 55 by a clip 56 that engages an outturned flange 57 on the outer end of the sleeve 54. The clip 56 is secured to the spacing block 58 by a pair of machine screws 59. These screws 59 also secure the spacing block 58 and the stud 55 to the handle bar 32. A depending crank arm 60 is formed as a part of the flange 57. This crank arm 60 is connected to the long arm 61 of a bell crank 62 by a connecting rod 63. The crank arm 61 is pivoted on a bearing 64 on the crosstie bar 37. A connecting rod 65 connects the short arm 66 of the bell crank 62 to one end of a lever 67 in the form of a flat plate intermediately pivoted to a bearing 68 in the handle bar 32. The connecting rod 65 is connected to the lever 67 by a yoke 69 that straddles said lever and is pivoted thereto. The connecting rod 65 has screw-threaded engagement with the transverse portion of the yoke 69 and is held from turning by a lock nut 70. A connecting rod 71 connects the lever 67, at its other end, to the short arm 72 of the bell crank 53. This connecting rod 71 is connected to the lever 67 and the short bell crank arm 72 by yokes 73 similar to the yoke 69 and lock nuts 73'. Obviously, by turning the grip 35 in the proper direction, the roll 51 may be forced into the belt 44 to tighten the same by the connections just described.

A combined sickle mount and guard 74 for a sickle 75 is rigidly secured at its longitudinal center to the plate 23 on the front end of the frame 12. The sickle 75 has, at its longitudinal center, a head 76 in the form of a yoke. The following connections are provided for reciprocating the sickle 75 from the motor-driven countershaft 43, to wit: a V belt 77 runs over a V pulley 78 on said countershaft and a V pulley 79 on a shaft 80 journaled in the bearing 17. The belt 77, like the belt 44, has sufficient slack to slip on the pulley 79 so that the same remains idle. Obviously, the belt 77 and the pulleys 78 and 79 afford a manually controlled slip connection. To tighten the belt 77, a roll 81 is provided to engage the upper run of said belt. This roll 81 is journaled on the long arm 82 of a lever 83 intermediately pivoted on the shaft 43. On the opposite end of the pitman shaft 80 from the pulley 79 is a crank in the form of a wheel 84. A rock shaft 85 is journaled in a rear bearing 86 on the frame 12 and a front bearing 87 on the plate 23. On the rear end of the rock shaft 85 is a crank arm 88 having a stud 89 provided with a ball 90. This ball 90 is mounted in a two-part bearing 91 affording a socket on one end of a pitman 92 that includes a tubular member 93 integral with the bearing 91 and a screw-threaded member 94 having threaded engagement with the member 93. A lock nut 95 on the screw-threaded member 94 impinges the adjacent end of the member 93. On the outer end of the pitman member 94, is a yoke 96 pivoted at 97 to a coupling 98 on the crank pin 99 of the crank wheel 84. The yoke 96 and the coupling 98 afford a universal joint. The pivot 97 of the coupling 98 extends transversely of the crank pin 99 as the same swings the crank arm 88 to turn the rock shaft 85. By screwing the pitman member 94 into and out of the pitman member 93, the operative length of the pitman 92 may be varied, at will.

On the outer end of the rock shaft 85 is a depending rocker arm 100 having an anti-friction roller 101 that works in the head 76 for reciprocating the sickle 75. On the outer end portion of the rock shaft 85, directly above the rocker arm 100, is an upstanding counterweight 102. This counterweight exactly balances the sickle 75, thereby eliminating vibration. A hood 103, for the major portion of the mechanism of the mower, extends from a point above the axle 29 to the front bearing 87 for the rock shaft 85. The hood 103, at its front end, is fitted on and secured to a member 103' on the back of the bearing 87. A collar 85' on the rock shaft 85 back of the member 103', together with the counterweight 102, hold said countershaft against axial movement in the bearings 86 and 87. The counterweight 102 performs another important function in that it throws the grass, as it is cut by the sickle 75, to either side thereof and prevents bunching thereof on the nose of the hood 103.

The following manually operated connections are provided for operating the lever 83 to either press the roller 81 onto the belt 77 to tighten the same to drive the pulley 79 or release the same, to wit: a handle 104 is mounted on the crosstie bar 37 to turn about the long axis thereof and held between opposing collars 104'. A connecting rod 105 connects the handle 104 to the short arm 106 of the lever 83. The connecting rod 105 is adjustably connected to the arm 106 by a yoke 107 that straddles said arm and is pivoted thereto. The connecting rod 105 has screw-threaded engagement with the yoke 107 to vary its operative length and is held by a lock nut 108 where adjusted. The connecting rod 105 is curved at 109 to fit over the crosstie rod 37 when the handle 104 is positioned to tighten the belt 77.

From the above description, it is evident that the handle grip 35 permits operating the pulley 46 without letting go of said handle grip. This is important particularly when the mower is travelling on rough ground or on a steep slope. By operating the hand grip 35 to release the pulley 46, the engine 38 will simply idle. The handle 104 is within easy reach of the operator and by throwing the same forwardly, the pulley 79 will be released and hence stop the reciprocating movement of the sickle 75; or by drawing the handle 104 rearwardly, said pulley is set. When the handle 104 is positioned to set the pulley 79, it is substantially in the plane of the connecting rod 105 and thereby locks the lever 83 with the roll 81 pressed onto the belt 77 to tighten the same, operates the pulley 79 and reciprocate the sickle 75.

The drawings illustrate a commercial form of the invention, but it will be understood that the same is capable of certain modifications as to details of construction, arrangement and combination of parts within the scope of the invention herein disclosed.

What I claim is:

1. In a machine of the class described, an inclined frame in the form of a tube having on its under side a transverse tubular bearing, an axle journaled in the bearing, a pair of ground wheels on the axle, a motor base on the upper end of the frame, a fixed plate on the lower end of the frame, a fixed upstanding plate on the frame extending longitudinally thereof, a front sleeve bearing and a rear sleeve bearing on the upstanding plate and extending transversely thereof, cutting mechanism mounted on the plate on the lower end of the frame, a motor on the base, a countershaft in the rear sleeve bearing, driving connections from the motor to the countershaft, a shaft in the front sleeve bearing, a manually controlled slip connection for driving the shaft from the countershaft, and means for operating the cutting mechanism from the shaft.

2. In a machine of the class described, a sickle having a head at its longitudinal center, a mount for the sickle, means for reciprocating the sickle including a driven transverse shaft, a longitudinal rock shaft between the sickle and the transverse shaft and having fixed at its inner end a crank arm and a rocker arm fixed to its outer end and attached to the head, a crank wheel fixed to the transverse shaft and having a crank pin, a coupling turnable on the crank pin, a pitman having on one end a yoke pivoted to the coupling to turn about an axis that extends transversely of the crank pin, and a ball and socket connecting the pitman at its other end to the crank arm.

JOSEPH M. MICHAELSON.

REFERENCES CITED

The following references are of record in the file of this patent:

UNITED STATES PATENTS

| Number | Name | Date |
| --- | --- | --- |
| 864,846 | Jenney | Sept. 3, 1907 |
| 961,485 | Dale et al. | June 14, 1910 |
| 1,188,810 | Mitchell | June 27, 1916 |
| 1,261,156 | Norton | Apr. 2, 1918 |
| 1,275,798 | Tosch | Aug. 13, 1918 |
| 1,383,850 | Pitts | July 5, 1921 |
| 1,650,668 | Travers | Nov. 29, 1927 |
| 1,902,524 | Roth | Mar. 21, 1933 |
| 2,190,161 | Moyer | Feb. 13, 1940 |
| 2,237,005 | Kinkead | Apr. 1, 1941 |
| 2,335,541 | Ronning | Nov. 30, 1943 |
| 2,448,074 | Bishop | Aug. 21, 1948 |
| 2,461,391 | Osterhaus | Feb. 8, 1949 |

FOREIGN PATENTS

| Number | Country | Date |
| --- | --- | --- |
| 194,947 | Switzerland | Mar. 22, 1923 |